United States Patent
Goodwin

(10) Patent No.: US 7,228,638 B2
(45) Date of Patent: Jun. 12, 2007

(54) MEASURING DEVICE

(75) Inventor: Jeffrey L. Goodwin, Fort Collins, CO (US)

(73) Assignee: Idaho Research Foundation, Inc., Moscow, ID (US)

( * ) Notice: Subject to any disclaimer, the term of this patent is extended or adjusted under 35 U.S.C. 154(b) by 21 days.

(21) Appl. No.: 11/107,061

(22) Filed: Apr. 15, 2005

(65) Prior Publication Data

US 2005/0241167 A1 Nov. 3, 2005

Related U.S. Application Data

(60) Provisional application No. 60/562,896, filed on Apr. 16, 2004.

(51) Int. Cl.
G01B 3/02 (2006.01)

(52) U.S. Cl. .............................. 33/511; 33/833; D10/71

(58) Field of Classification Search .................. 33/511, 33/512, 700, 712, 832, 833, 549, 551, 483, 33/492, 494, 758, 759, 770, 771; D10/64, D10/70, 71
See application file for complete search history.

(56) References Cited

U.S. PATENT DOCUMENTS

| | | | |
|---|---|---|---|
| 287,480 A * | 10/1883 | Smith | 33/483 |
| D185,045 S * | 4/1959 | Slaton | D10/61 |
| 3,406,456 A * | 10/1968 | Schleich | 33/492 |
| 3,438,134 A * | 4/1969 | Schunk | 33/515 |
| 4,300,289 A * | 11/1981 | DeHaven | 33/770 |
| 4,429,462 A * | 2/1984 | Rutty et al. | 33/757 |
| 4,603,481 A * | 8/1986 | Cohen et al. | 33/768 |
| 4,930,227 A * | 6/1990 | Ketchpel | 33/755 |
| 5,097,617 A * | 3/1992 | Craven | 43/4 |
| 5,251,382 A * | 10/1993 | Hellar | 33/759 |
| 5,339,532 A * | 8/1994 | O'Keefe | 33/511 |
| 6,032,379 A * | 3/2000 | Usami | 33/758 |
| 6,134,798 A * | 10/2000 | Duncan et al. | 33/484 |
| 6,256,896 B1 * | 7/2001 | Landauer | 33/512 |
| 6,594,939 B2 * | 7/2003 | Ondusko | 43/4 |
| D506,398 S * | 6/2005 | Bunkowfst | D10/70 |
| 7,059,060 B1 * | 6/2006 | Baumgartner | 33/494 |
| 2004/0025364 A1 * | 2/2004 | Elder et al. | 33/770 |
| 2005/0241167 A1 * | 11/2005 | Goodwin | 33/511 |

FOREIGN PATENT DOCUMENTS

FR 2582190 A1 * 11/1986

* cited by examiner

Primary Examiner—R. Alexander Smith
(74) Attorney, Agent, or Firm—Ormiston & McKinney, PLLC

(57) ABSTRACT

In one embodiment, a measuring device includes a reference surface, a trough extending lengthwise away from the reference surface at substantially a right angle, and a scale affixed to the trough indicating a distance from the reference surface along the trough.

11 Claims, 4 Drawing Sheets

MEASURING DEVICE

CROSS REFERENCE TO RELATED APPLICATIONS

This application claims subject matter disclosed in co-pending provisional patent application Ser. No. 60/562,896 filed Apr. 16, 2004.

BACKGROUND

Embodiments of the invention were developed in an effort to provide a device that could consistently accurately measure the length of a lamb's tail.

DETAILED DESCRIPTION

Figure 1:
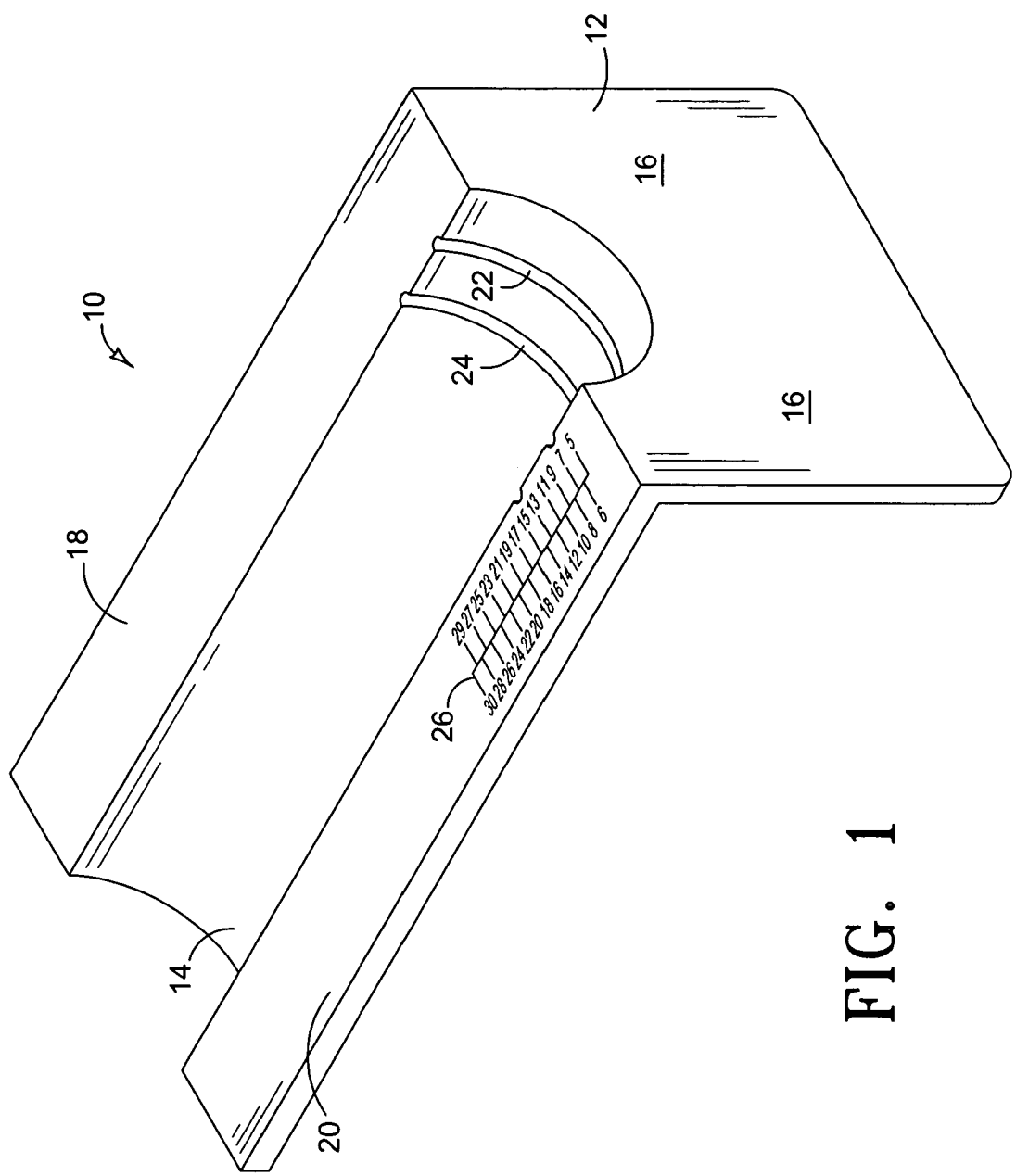
FIGS. 1 and 2 are perspective and plan views, respectively, of a measuring device according to one embodiment of the invention.
Figure 2:
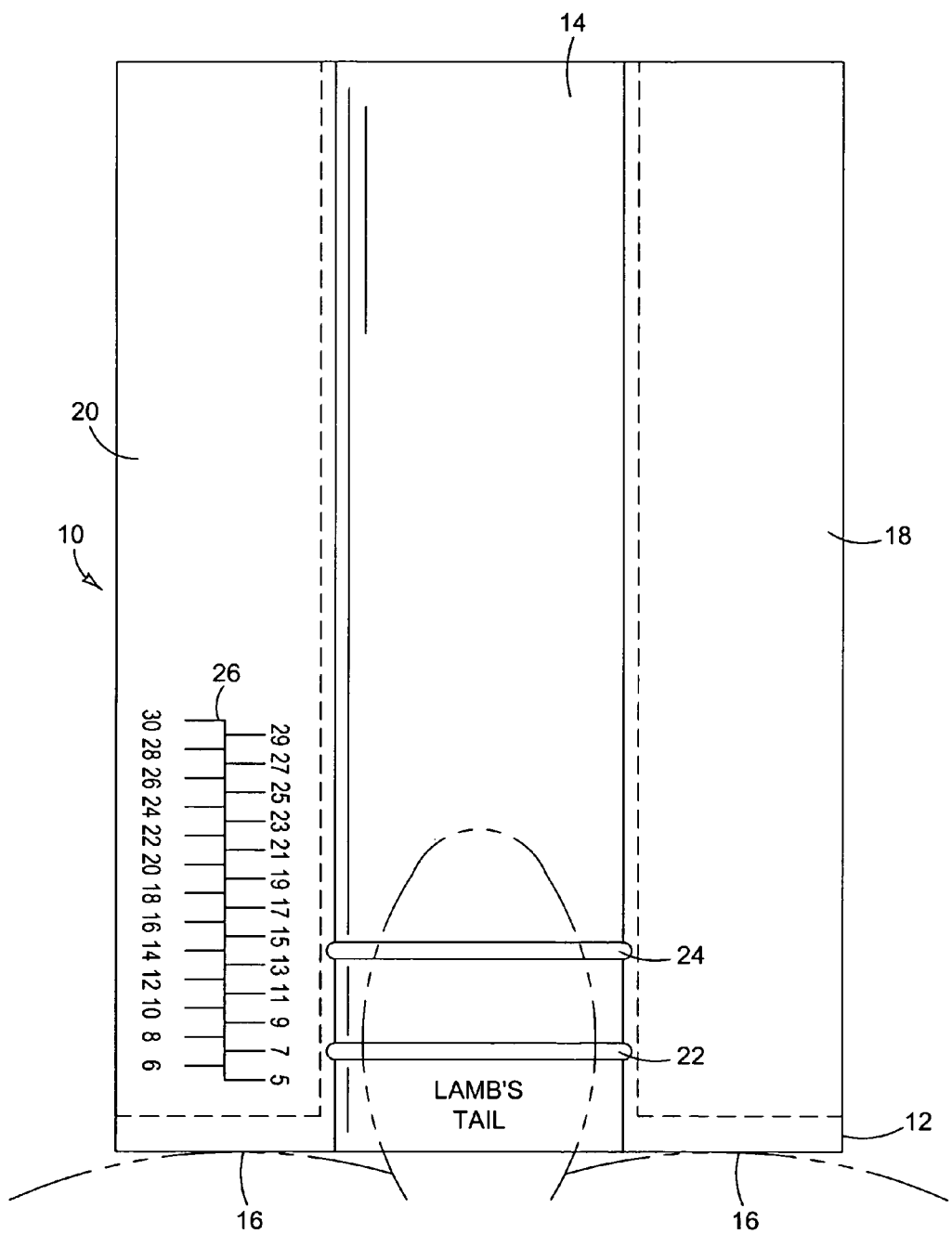

Referring to FIGS. 1 and 2, measuring device 10 includes a face 12 and a trough 14 extending away from face 12. In the embodiment shown in FIGS. 1 and 2, trough 14 has a semi-circular cross section and extends away from face 12 at a 90° angle. Face 12 provides a reference surface 16 for establishing a linear measurement along trough 14. Flanges 18 and 20 extend away from trough 14 perpendicular to face 12. In the embodiment of measuring device 10 shown in FIGS. 1 and 2, two scales are used—(1) recesses 22 and 24 formed in trough 14 at predetermined distances from reference surface 16 and (2) a numerical scale 26 extending along flange 20 adjacent to trough 14 marking the distances from reference surface 16. Flanges 18 and 20 provide structural support to trough 14 and a platform for numerical scale 26.

One embodiment of measuring device 10 was developed to measure the length of a lamb's tail. For a lamb's tail measuring device 10, the lamb's tail lays in trough 14 as surface 16 of face 12 is pressed against the lamb's pin bones to establish a consistent reference to measure the length of the lamb's tail along trough 14. Although the size of lamb's tails vary, it is expected that a trough 14 having a diameter of about 2" will be adequate to cradle most lamb's tails comfortably but without affording the tail too much wiggle room. Reference surface 16 should extend at least 2" below the bottom of trough 14 to ensure that surface 16 extends past the lamb's pin bones when the tail is cradled in trough 14. A typical scale 26 for a lamb's tail measuring device 10 would be set off in increments of tenths of an inch from 5 to 30 (0.5" to 3.0"). The nearer recess 22 establishes a minimum tail length, 0.7" for example for a 4H project lamb.

Figure 3:
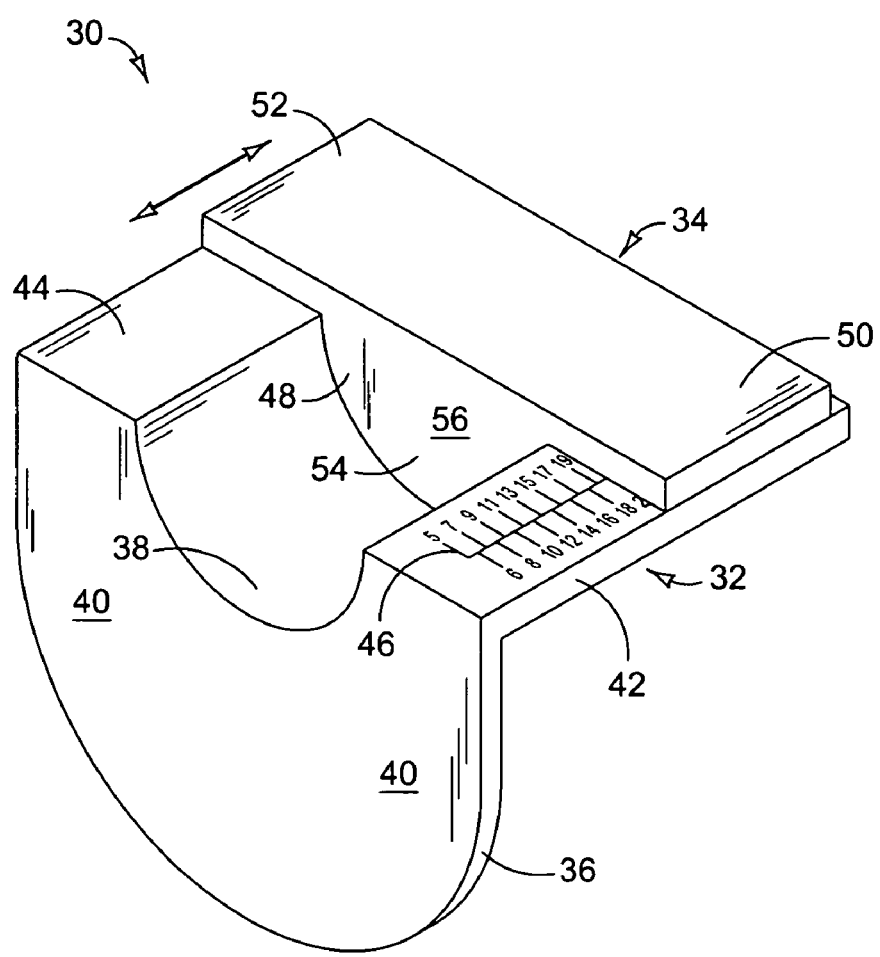
FIG. 3 is a perspective view of a measuring device according to a second embodiment of the invention.
Figure 4:
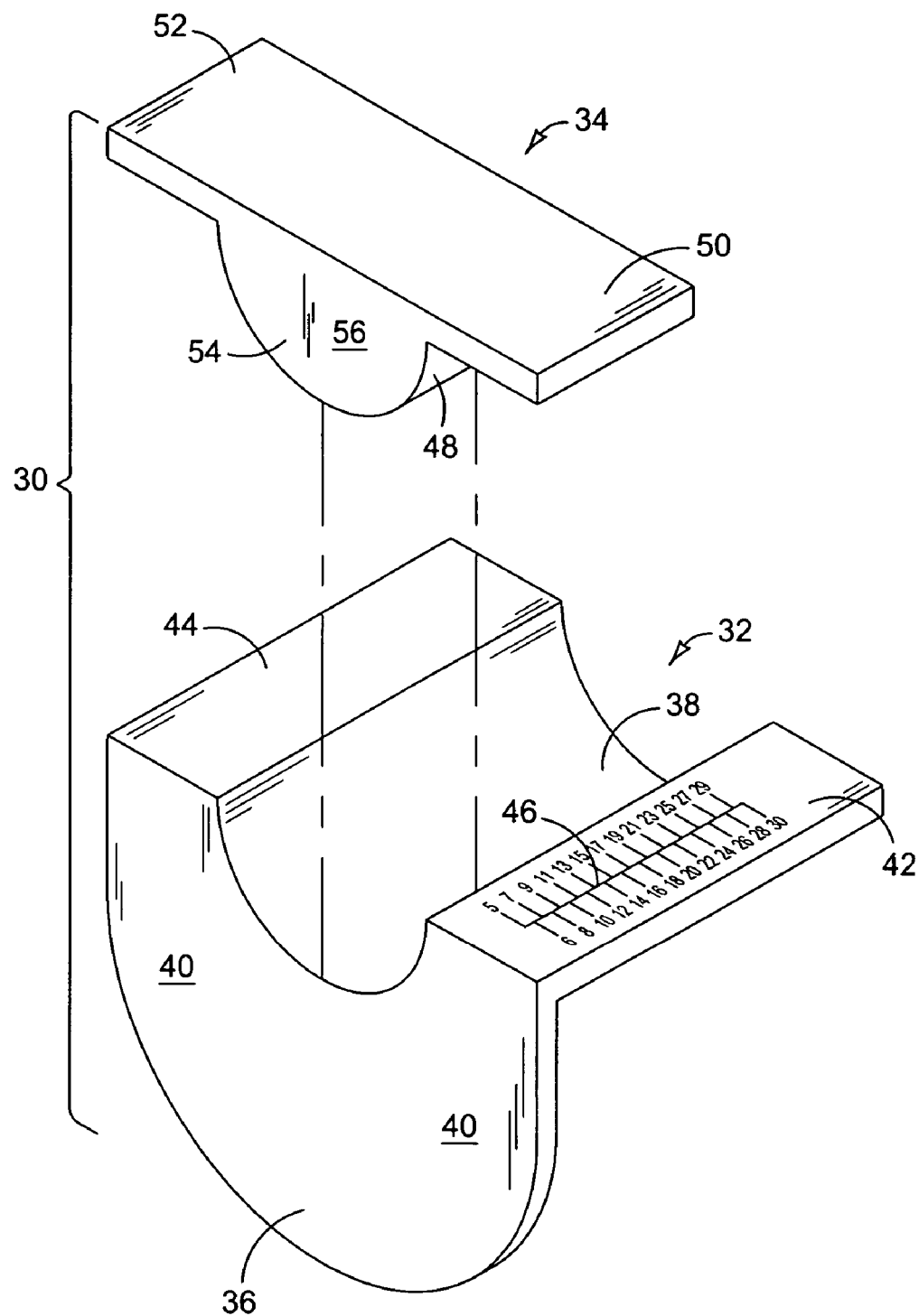
FIG. 4 is an exploded perspective view of the measuring device of FIG. 3.

Referring now to a measuring device 30 shown in FIGS. 3–4, measuring device 30 includes a base 32 and a slider 34. Base 32 includes a face 36 and a trough 38 extending away from face 36. Trough 38 has a semi-circular cross section and extends away from face 36 at a 90° angle. Face 36 provides a reference surface 40 for establishing a linear measurement along trough 38. Flanges 42 and 44 extend away from trough 38 perpendicular to face 36. A numerical scale 46 extends along flange 42 adjacent to trough 38 marking distances from reference surface 40. Flanges 42 and 44 provide structural support to trough 38, a platform for numerical scale 26 and bearing surfaces for slider 34.

Slider 34 includes a barrel 48 and wings 50 and 52 that extend out from each side of barrel 48. Barrel 48 conforms to the shape of trough 38 and wings 50, 52 are positioned to slide along or just above flanges 42, 44 on base 32. A barrel face 54 acts as a reference surface 56 for establishing a linear measurement along trough 38 relative to base reference surface 40.

One embodiment of measuring device 30 was developed to measure the length of a lamb's tail. For a lamb's tail measuring device 30, the lamb's tail lays in trough 38 as base reference surface 40 is pressed against the lamb's pin bones to establish a consistent reference to measure the length of the lamb's tail along trough 38. Slider 34 is moved forward in trough 38 until barrel reference surface 56 abuts the end of the lamb's tail. The length of the tail is read from scale 46 at the increment aligned with barrel reference surface 56.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A measuring device, comprising:
   a reference surface;
   a trough having an open end attached to the reference surface such that the reference surface does not obstruct the open end of the trough, the trough extending lengthwise away from the reference surface;
   a flange adjacent to the trough and extending lengthwise away from the reference surface at substantially a right angle; and
   a scale comprising a plurality of marks on the flange, the scale indicating a distance from the reference surface along the trough.

2. The device of claim 1, wherein the trough extends away from the reference surface at substantially a right angle.

3. The device of claim 1, wherein the scale further comprises a plurality of marks each extending laterally across the trough.

4. The device of claim 3, wherein the marks comprise recesses in the trough.

5. The device of claim 1, wherein the trough is characterized by a semi-circular cross section and the reference surface extends around an outer part of the semi-circle of the open end of the trough.

6. The device of claim 1, further comprising a slider slidable in the trough, the slider cooperating with the scale such that a distance of the slider from the reference surface along the trough is indicated on the scale.

7. A measuring device, comprising:
   a trough having a semi-circular cross section with a diameter of about two inches;
   a reference surface at an open end of the trough, the reference surface and the trough intersecting one another at a right angle and the reference surface extending at least two inches below a bottom of the trough; and
   a scale indicating a distance from the reference surface along the trough.

8. A measuring device, comprising:
   a reference surface;
   a trough having a semi-circular cross section with a diameter of about two inches and an open end attached to the reference surface such that the reference surface does not obstruct the open end of the trough, the trough extending lengthwise away from the reference surface at substantially a right angle and the reference surface extends at least two inches below a bottom of the open end of the trough;

a slider slidable in the trough; and a scale affixed to the trough indicating a distance of the slider from the reference surface along the trough.

9. A measuring device, comprising:

a base having a base reference surface, a trough extending lengthwise away from the reference surface, a first flange extending along one side of the trough away from the reference surface at substantially a right angle, and a second flange extending along another side of the trough away from the reference surface at substantially a right angle;

a slider slidable in the trough, the slider having a barrel conforming to the shape of the trough and wings extending out from opposite sides of the barrel over the flanges; and a scale on one or both flanges indicating a distance of the barrel from the reference surface in the trough.

10. The device of claim 9, wherein the barrel includes a barrel reference surface that is parallel to the base reference surface when the slider is positioned in the trough.

11. The device of claim 9, wherein the trough comprises a trough having an open end attached to the reference surface such that the reference surface does not obstruct the open end of the trough.

* * * * *